W. E. SUPERNAW.
SETTLING TANK VALVE.
APPLICATION FILED MAR. 15, 1916.
1,235,079.
Patented July 31, 1917.
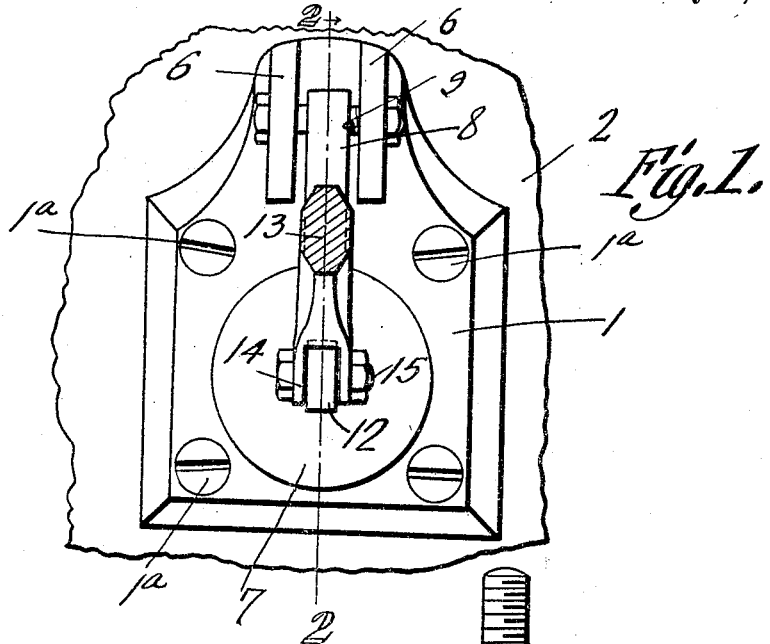
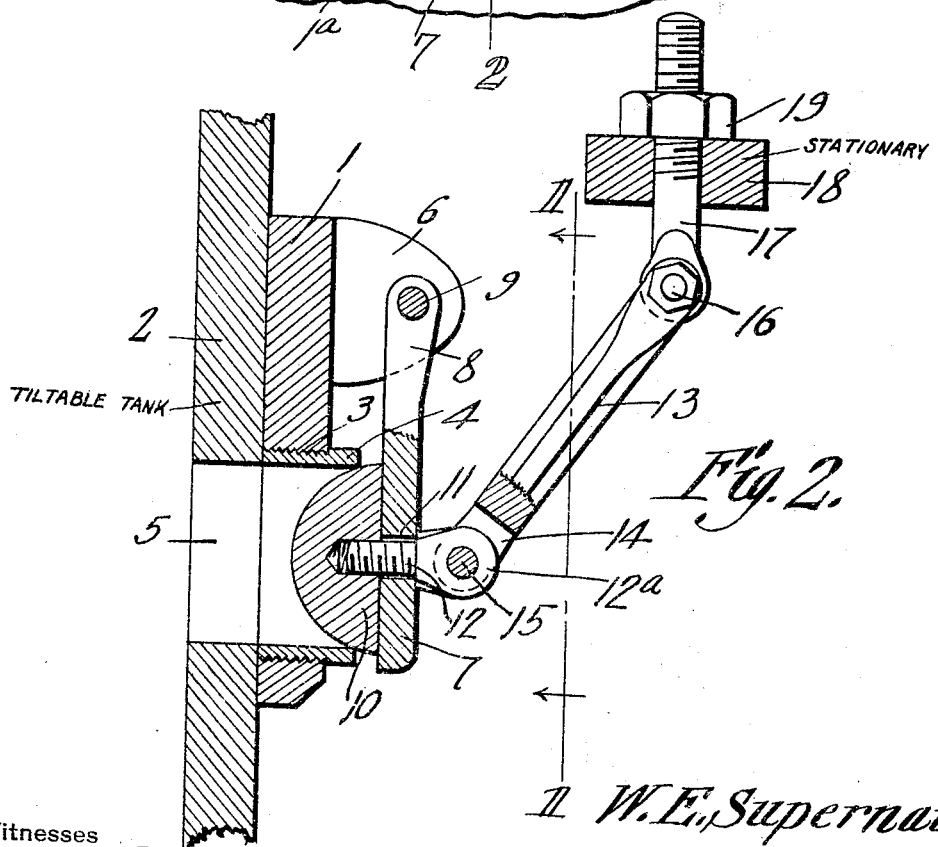
Witnesses
W. E. Supernaw
Inventor
by
Attorneys

UNITED STATES PATENT OFFICE.

WILLIAM E. SUPERNAW, OF ELGIN, ILLINOIS.

SETTLING-TANK VALVE.

1,235,079.  Specification of Letters Patent.  Patented July 31, 1917.

Application filed March 15, 1916. Serial No. 84,477.

*To all whom it may concern:*

Be it known that I, WILLIAM E. SUPERNAW, a citizen of the United States, residing at Elgin, in the county of Kane and State of Illinois, have invented a new and useful Settling-Tank Valve, of which the following is a specification.

The present invention appertains to valves, and relates more especially to valves for settling tanks, it being the object of the invention to provide a novel and improved valve of that nature.

It is the object of the invention to provide means for mounting and controlling the valve member, to enhance the utility of the device, the present device being used in sand and gravel washers, or in ore mines of all kinds for separating material from water and dirt.

Another object of the invention is the provision of a settling tank valve having the characteristics above noted, and which is comparatively simple and inexpensive in construction, the parts being readily assembled and replaced, and the device being practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is an elevation of the device, partially in section on the line 1—1 of Fig. 2.

Fig. 2 is a vertical section on the line 2—2 of Fig. 1, portions being shown in elevation.

In carrying out the invention, there is provided a vertical plate or body 1 which is secured by means of screws 1ª, or in any other suitable manner, to the outer side of the settling tank 2. The plate 1 is provided adjacent its lower end with an opening 3 into which is threaded a nipple 4 projecting from the outer side of the plate 1 to provide a valve seat. The tank 2 is provided with an opening 5 registering with the nipple 4.

The plate 1 is provided adjacent its upper end with a pair of outstanding vertical ears 6 from which is suspended a disk 7 having an upwardly projecting shank 8 pivoted upon a bolt or other pivot member 9 engaged through the ears 6, thereby to suspend said disk 7 from the pivot 9 to swing to and from the nipple 4. A hemi-spherical valve member 10 has its flat side resting against the inner side of the disk 7, said member 10 being of slightly smaller diameter than the disk, and being attached thereto. The disk 7 has a central aperture 11 through which is passed the threaded shank of a clamping screw 12 which is threaded into the member 10 to clamp it against the disk 7, and the screw 12 has an eye 12ª outstanding from the disk 7. When the screw 12 is loosened, the member 10 can be removed and replaced. The nipple 4 is also replaceable when worn, and the member 10 is movable partially into the outer end of the nipple, as seen in Fig. 2.

The position of the value member is controlled by a short inclined link 13 having its lower end bifurcated, as at 14, and pivoted to the eye 12ª of the bolt 12 by means of a bolt or other suitable pivot 15. The upper end of the link 13 which is farther away from the tank than the lower end of the link, is pivoted, as at 16, to the lower end of a vertically adjusting bolt 17 which extends upwardly through a bar or timber 18 near the outlet. A nut 19 is threaded upon the bolt 17 and seats upon the bar 18 for supporting the link 13 at the desired position. By adjusting the nut 19, the link 13 can be raised and lowered, to adjust the position of the disk or hanger 7 and valve member 10 carried thereby. The present valve member and its mounting acts as a counter balance for controlling the outlet of the material from the settling tank through the nipple 4.

In order that the function of the valve can be better understood, it might be stated that the tank 2 is mounted for tilting movement, as usual, whereby when the tank tips or tilts, the nipple or valve seat will be removed from the valve member, thus letting the contents flow out of the tank. When the tank is empty, it returns to normal position, bringing the nipple or valve seat against the valve member to close the outlet opening. The present valve has the office of separating sand and gravel from water and clay, or for separating other materials. The stationary timber 18 not only supports the valve member, but also limits the tilting movement of the tank.

The nipple 4 instead of being threaded within the plate 1 can be secured removably thereto in any suitable manner. The end of the nipple being cut square, will leave a sharp edge which engages the member 10. The sand or other material passing through the nipple works against the member 10 and keeps it worn evenly, whereby it will properly fit the nipple or seat when the valve is closed. If a stone or other object should lodge between the nipple and valve member 10, it will be dislodged from between the sharp edge of the nipple and the rounded surface of the valve member.

Having thus described the invention, what is claimed as new is:

In combination, a tiltable tank having an outlet, a stationary supporting member near said outlet, a body secured to the tank and having a valve seat outside of said outlet, a hanger pivotally connected with the body above the valve seat, a hemi-spherical valve member having its flat side resting against the hanger, the curved surface of the valve member being seatable against the valve seat, a securing element engaged through said hanger and taking into the valve member to clamp them together, an adjustable member carried by the supporting member, and a short inclined link pivoted at its upper end to said adjustable member and at its lower end to said securing element.

In testimony that I claim the foregoing as my own, I have hereto affixed my signature in the presence of two witnesses.

WILLIAM E. SUPERNAW.

Witnesses:
CHAS. SUPERNAW,
ELDON LEE.

Copies of this patent may be obtained for five cents each, by addressing the "Commissioner of Patents, Washington, D. C."